United States Patent [19]
Parrish

[11] Patent Number: 5,936,380
[45] Date of Patent: Aug. 10, 1999

[54] ALTERNATIVE POWER FOR A PORTABLE COMPUTER VIA SOLAR CELLS

[75] Inventor: Sean T. Parrish, Boise, Id.

[73] Assignee: Micron Electronics, Inc., Nampa, Id.

[21] Appl. No.: 08/929,356

[22] Filed: Sep. 12, 1997

[51] Int. Cl.⁶ .......................... H01M 10/44; H01M 10/46
[52] U.S. Cl. ............................................. 320/101; 136/293
[58] Field of Search .................................... 320/101, 118, 320/125, 139; 136/244, 245, 293; 323/906

[56] References Cited

U.S. PATENT DOCUMENTS

| | | |
|---|---|---|
| 4,083,097 | 4/1978 | Anagnostou et al. . |
| 4,563,727 | 1/1986 | Curiel . |
| 4,686,441 | 8/1987 | Petterson . |
| 4,782,617 | 11/1988 | Peikin ....................................... 43/18.1 |
| 5,039,928 | 8/1991 | Nishi et al. . |
| 5,260,885 | 11/1993 | Ma . |
| 5,300,874 | 4/1994 | Shimamoto et al. . |
| 5,477,239 | 12/1995 | Busch et al. . |
| 5,522,943 | 6/1996 | Spencer et al. . |
| 5,532,524 | 7/1996 | Townsley et al. . |
| 5,698,964 | 12/1997 | Kates et al. . |

*Primary Examiner*—Edward H. Tso
*Attorney, Agent, or Firm*—Dorsey & Whitney LLP

[57] ABSTRACT

A system for prolonging the operational life of a battery-powered laptop or notebook computer. Solar cells are incorporated into the chassis or display screen of a notebook computer so that the solar cells can provide power to any component of the notebook computer and/or help with the charging, powering, and/or regulation of a battery used as a power source. In one embodiment, solar cells are mounted near the light source so that unused light energy from the light source can be captured.

16 Claims, 8 Drawing Sheets

ALTERNATIVE POWER FOR A PORTABLE COMPUTER VIA SOLAR CELLS

This application is related to an application with the same title filed on even date herewith, Ser. No. 08/928,888.

FIELD OF THE INVENTION

The present invention relates generally to the use of power from solar cells in connection with laptop, portable, and/or notebook computers. More particularly, the present invention relates to the manner in which solar cells can be used effectively in the electrical power system of such a computer.

BACKGROUND AND SUMMARY OF THE DISCLOSURE

Over the past ten years, notebook computers have become very advanced, widely accepted, and a significant convenience for mobile people. Currently, the primary source of power for such computers is a rechargeable battery, which is recharged periodically by plugging the computer into an outlet or other external power source. And as is well known in the art, many types of batteries have been used (e.g., Ni-Cd, Mi-MH, and Li-ion). Modern batteries of this sort generally have a life expectancy of anywhere between two to four hours of computer use for a given charge. Modern notebook computers are useful, but the limitations on battery life nevertheless significantly limit the usefulness of a notebook computer in an environment where frequent charging is not feasible.

The present invention seeks to remedy these deficiencies by incorporating solar cells into a portable computer to provide an alternate, supplemental source of power. In one embodiment of the present invention, solar cells are incorporated into the display screen assembly of a notebook computer in an unobtrusive and efficient manner. With such a configuration, the notebook computer maintains its portability and functionality, while lengthening the amount of time that the notebook computer can be used without being charged.

The solar cells provide an alternative source of power to help with the charging and powering of the power source in a portable computer.

The advantages and features of the invention may become apparent and the nature of the invention may be more clearly understood by reference to the following detailed description of the invention, the appended claims, and to the several drawings herein.

DETAILED DESCRIPTION

Figure 1:
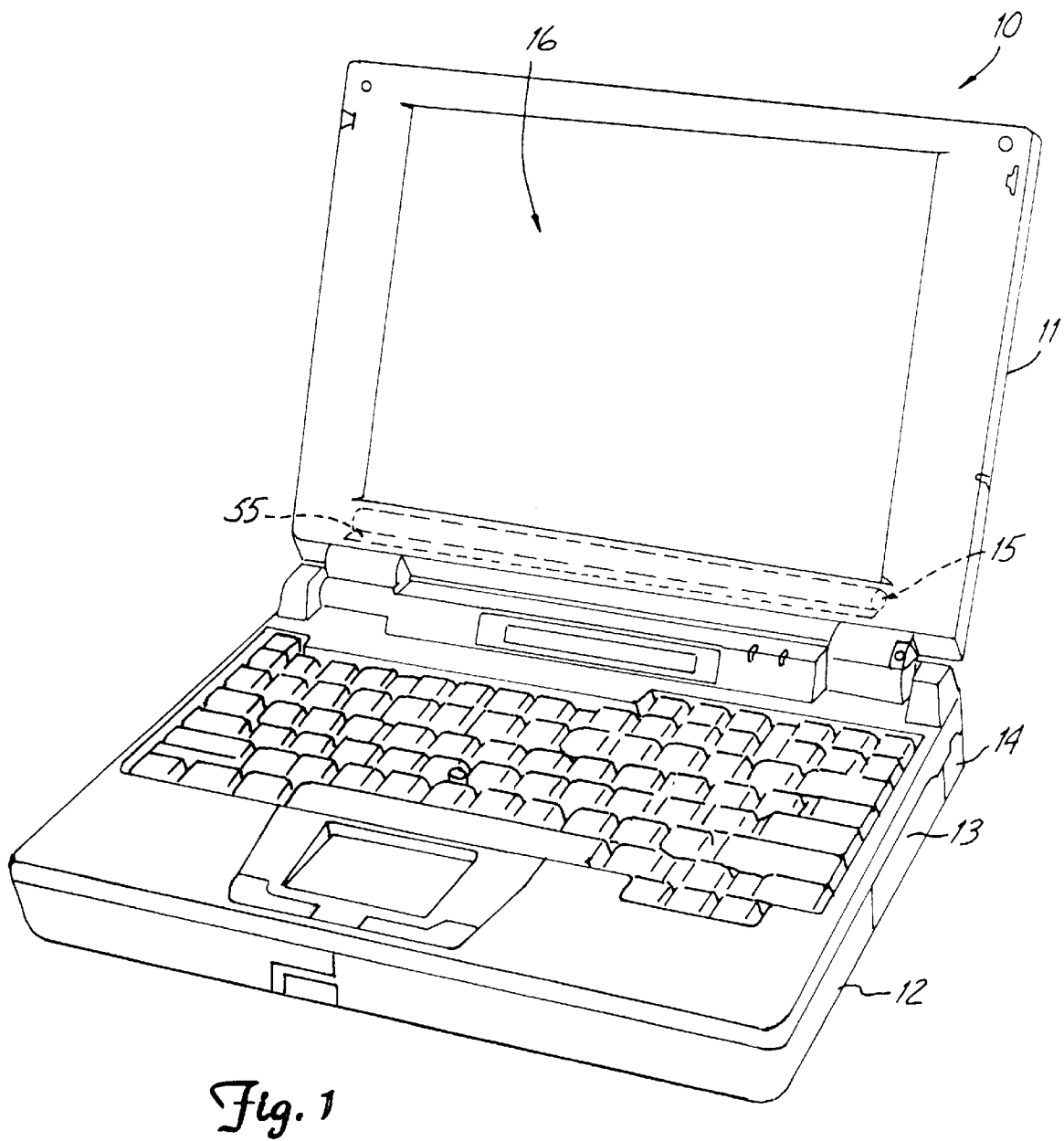
FIG. 1 is a drawing of a notebook computer showing an embodiment of the present invention.

FIG. 1 is a perspective view of a notebook computer 10, which includes a display panel 11 and a chassis 12. The chassis 12 includes a rechargeable battery 13 and an external power plug 14. The power plug 14 is the port into which a power cord connected to an external power source (e.g., an AC to DC transformer) is inserted. As is well known in the art, when connected to an external power source in this way, the rechargeable battery 13 is recharged as needed, and the computer 10 is also powered by the external source.

The display panel 11 includes a display screen 16 of some type, such as an LCD display screen, and also has mounted therein a light source 15 for delivering light to a lightpipe (not shown in FIG. 1) as is known in the art (e.g., U.S. Pat. No. 5,050,946, the specification of which is hereby incorporated by reference). The display panel 11 may in accordance with one embodiment of the present invention include an array of solar cells 55. (Although the term "solar" cells is used herein, it is understood to mean any photoelectric device that converts light into electricity, regardless of whether the light comes from the sun or from a lamp or other artificial source.) The solar cells may be amorphous thin film solar cells, and may be positioned in one of the ways described more fully below.

Figure 2:
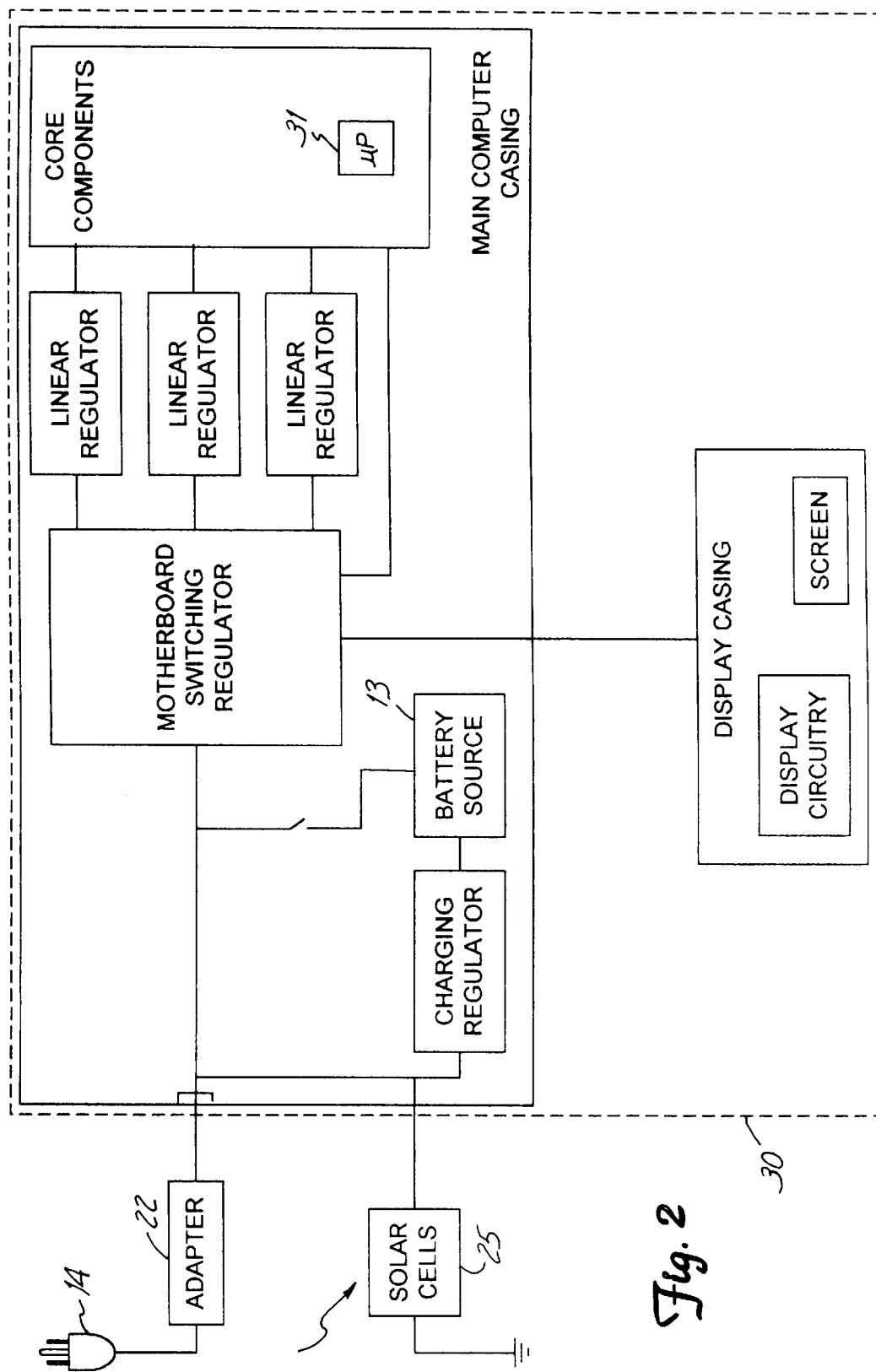
FIG. 2 is a block diagram of the sources of power in one embodiment of the present invention, where the battery can be powered by either an external source, or by solar power.

FIG. 2 is a block diagram of the electrical power system of the notebook computer of one embodiment of the present invention. As shown, the computer 30 (which typically includes a microprocessor 31 as CPU, associated chipset, display screen, and other logic) is capable of receiving power from a number of sources. For example, when the plug 14 is connected to an external power source, the power converter 22 performs any power conversions that may be necessary, and the computer 30 is then powered by this external source. At the same time, the rechargeable battery 13 is also recharged (if necessary) by the external power source. And when the external power source is not available, the computer 30 is powered by the rechargeable battery 13. In one embodiment, these components may operate as described in U.S. Pat. No. 5,532,524, which is hereby fully incorporated by reference.

Also shown in FIG. 2 are solar cells 25. These solar cells 25 provide a direct current (DC) power source that is integrated into the electrical power system of FIG. 2. When the solar cells 25 receive light energy, this energy is converted into electric potential which may then be coupled to the other power sources and/or used in the electrical power system of FIG. 2. The electric potential from the solar cells 25 can be used to help recharge the DC battery 13, thereby prolonging the overall life of the rechargeable battery 13 before a full recharge is needed.

Figure 3:
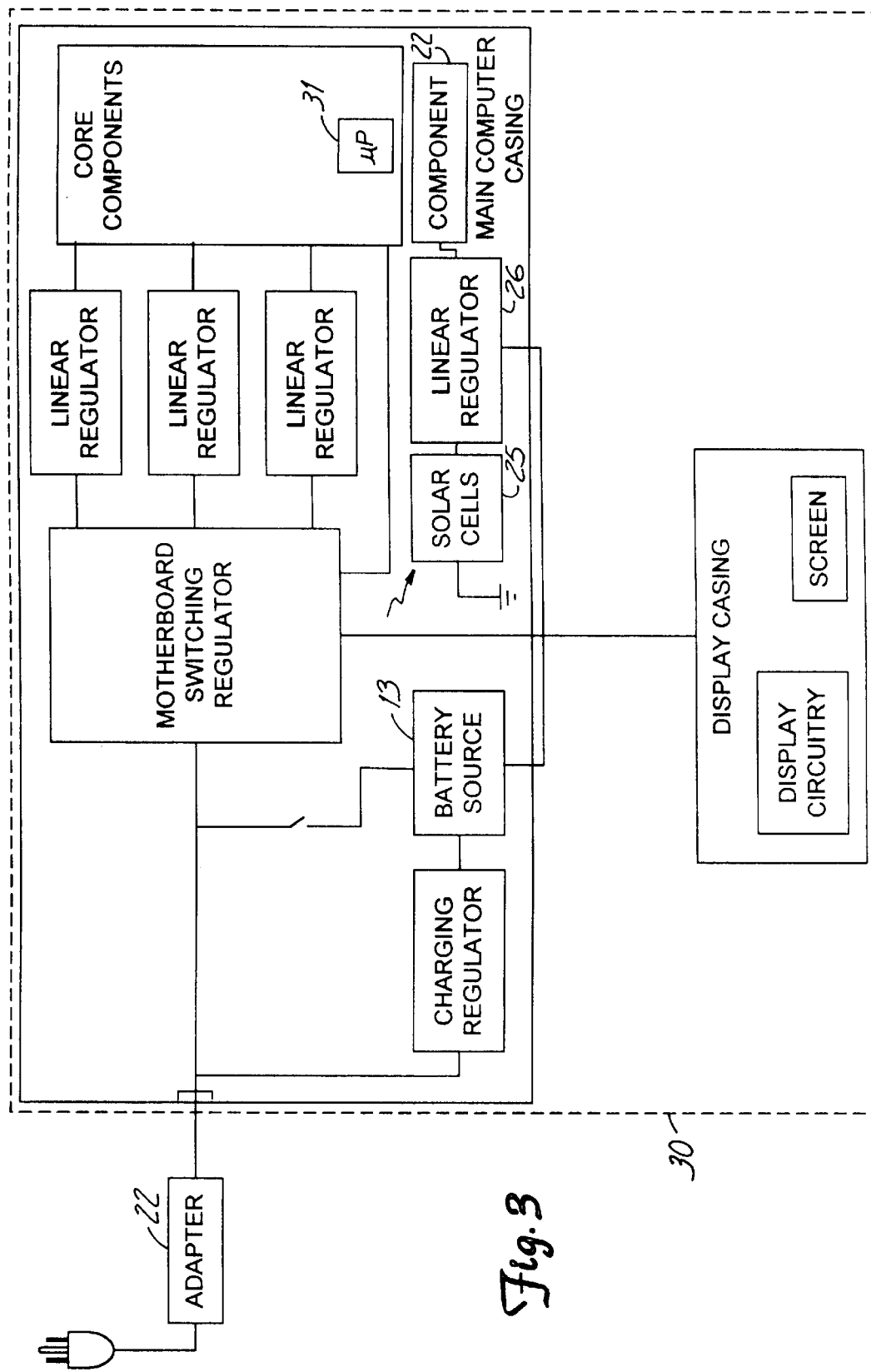
FIG. 3 is a block diagram of the sources of power in another embodiment of the present invention, where the solar cells are used to provide power to a specific component of the notebook computer.

In another embodiment of the present invention the electrical power system is configured so that the solar cells 25 are used to provide power to a particular portion of the notebook computer, such as one DC component (e.g., floppy disk drive) within the notebook computer 30, as shown in FIG. 3. In such an embodiment, the use of the solar cells 25 to supply power to one power-consuming component 27 of the notebook computer will ease the load on the rechargeable battery 13, thereby prolonging the life of battery 13. In another embodiment, also shown in FIG. 3, the rechargeable battery 13 can also be linked to the linear regulator 26 and used to supplement the power supplied by the solar cells 25 when the solar cells do not provide a sufficient amount of power to the component 27.

It is also possible to use the solar cells 25 to help supply power to an AC component, such as the backlight inverter for the display screen. Such an embodiment would be useful because the display screen is one of the largest consumers of power, and relieving the battery 13 of the burden of supplying power to the display screen (even partially) will significantly prolong battery life. However, using the solar cells 25 to supply additional or supplemental power to an AC component is not as efficient because of the energy lost converting the DC power from the solar cells 25 to the AC power required by such a component.

Figure 4:
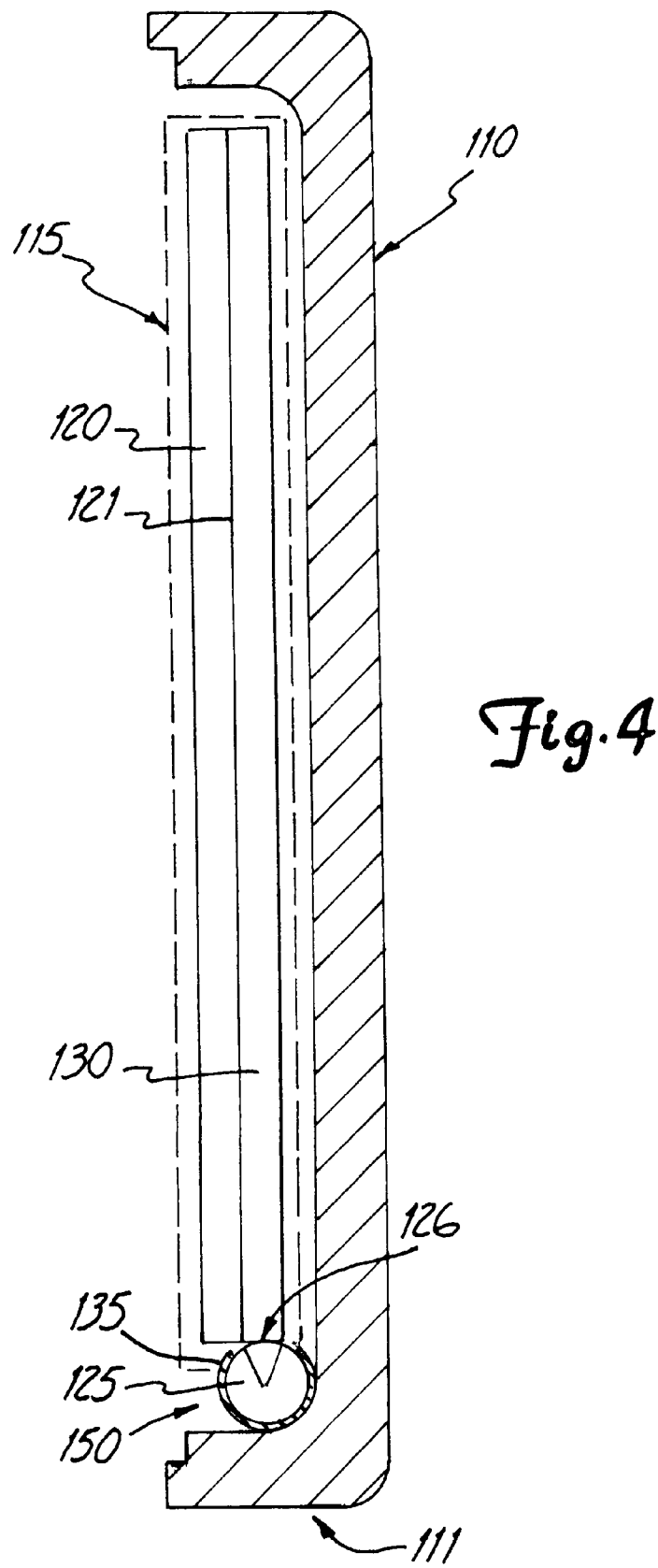
FIG. 4 is a cross-sectional view of a fliptop display screen of the notebook computer of FIG. 1 showing a light source with associated solar cells for supplying light to a lightpipe that illuminates an LCD display.

Referring now to FIG. 4, the LCD display screen 115 contained within housing 110 includes an LCD panel 120, a cylindrical light source 125 and a light pipe 130. The light source 125 extends across an elongated cavity 150 adjacent to the lower edge of display screen 115. The aperture 126 of the light source 125 is aligned adjacent to an edge of the light pipe 130. The light pipe 130 is immediately adjacent to the back surface 121 of the LCD panel 120.

Because conventional LCD's function like a light valve and even when "on" are not highly transmissive (monochrome LCD, approx. 12% transmissive; color LCD, approx. 2% transmissive) relatively large amounts of uniform light are necessary to illuminate the display. Thus, a relatively bright light source 125 is needed to provide backlighting. Unfortunately, significant amounts of light from light source 125 do not reach the screen viewer's eyes. Losses occur by absorption or reflection of light away from the desired direction in many places. For example, coupling of light at the aperture 126 into the edge of light pipe 130 is imperfect. Although the light source 125 may have a reflective layer or a surrounding reflector (not shown) this, too, is imperfect and light escapes through it or is misdirected by it. Some light sources 125 do not use a reflector at all, because it can complicate the difficult task of achieving approximately uniform light intensity at all points on the LCD panel 120. Finally, light that escapes through the LCD panel 120 that does not travel in the direction of the viewer's eye is not optimal.

As a result of these factors, the region around the light source 125 has significant light energy that is not effectively used in providing a screen display. It is often at least partially wasted, and thus represents an inefficient use of scarce battery power.

To reduce this waste and prolong battery life, the present invention proposes capture of escaping and otherwise wasted light. In one embodiment, this is done by placing solar cells adjacent to the light source 125. As seen in FIG. 4, this can be done by surrounding the surface of light source 125, except for aperture 126, with a closely fitting, curved array of solar cells 135. This array allows the solar cells to be incorporated in the cavity 150 in an unobtrusive manner and so that the useful size of the display screen is not reduced. By placing the solar cells 135 closely adjacent to the surface from which otherwise wasted light escapes, this approach can be made effective. However, it may require a close fit of the solar cells 135 with the light source 125, which can be difficult or expensive to manufacture or assemble.

Figure 5:
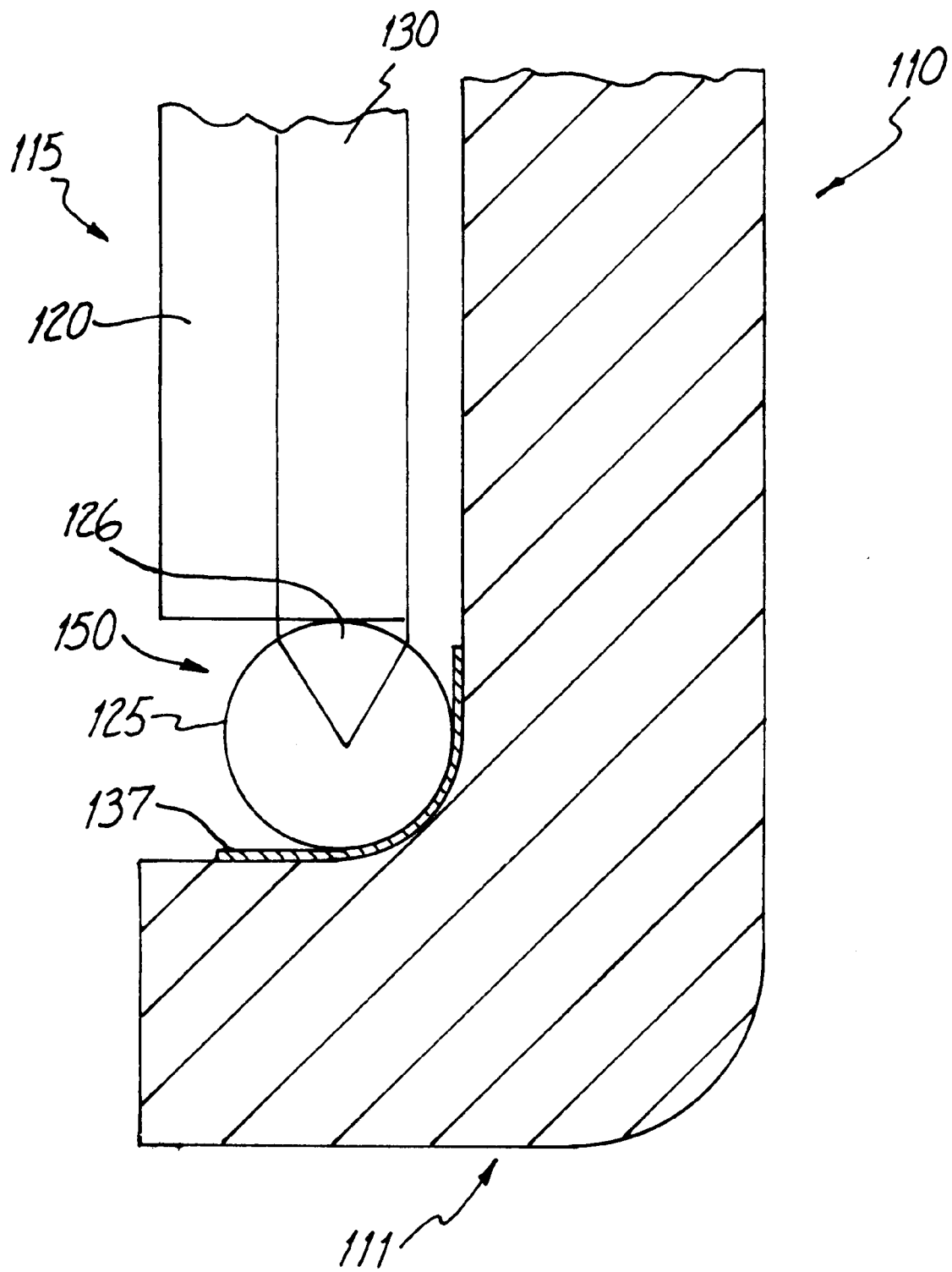
FIG. 5 is a modified close-up view of the lower portion of FIG. 4, showing the light source and an alternative embodiment of an associated array of solar cells.
Figure 6:
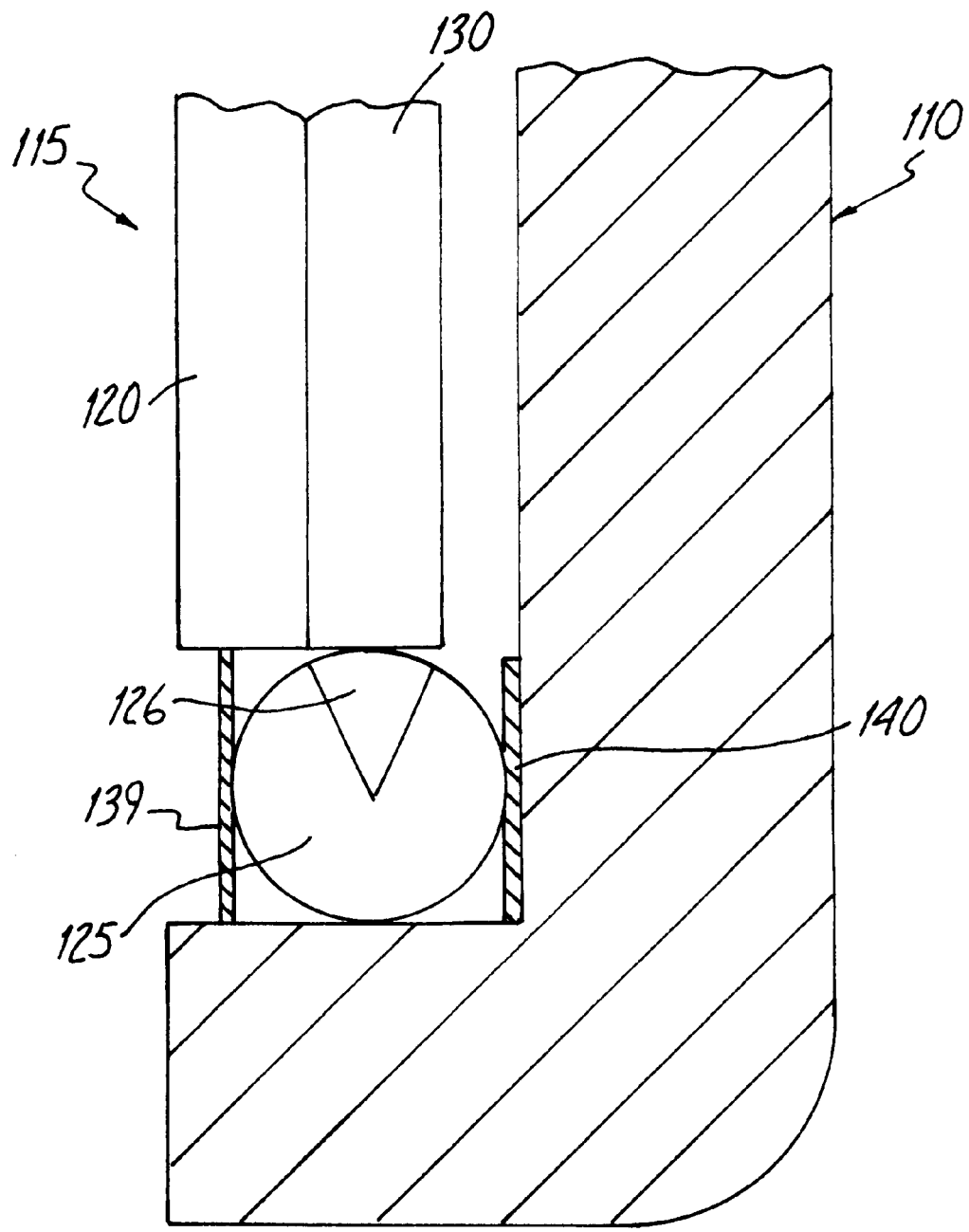
FIG. 6 is a modified close-up view of the lower portion of FIG. 4 showing a light source coupled to a lightpipe with planar arrays of solar cells positioned on either side of the light source.
Figure 7:
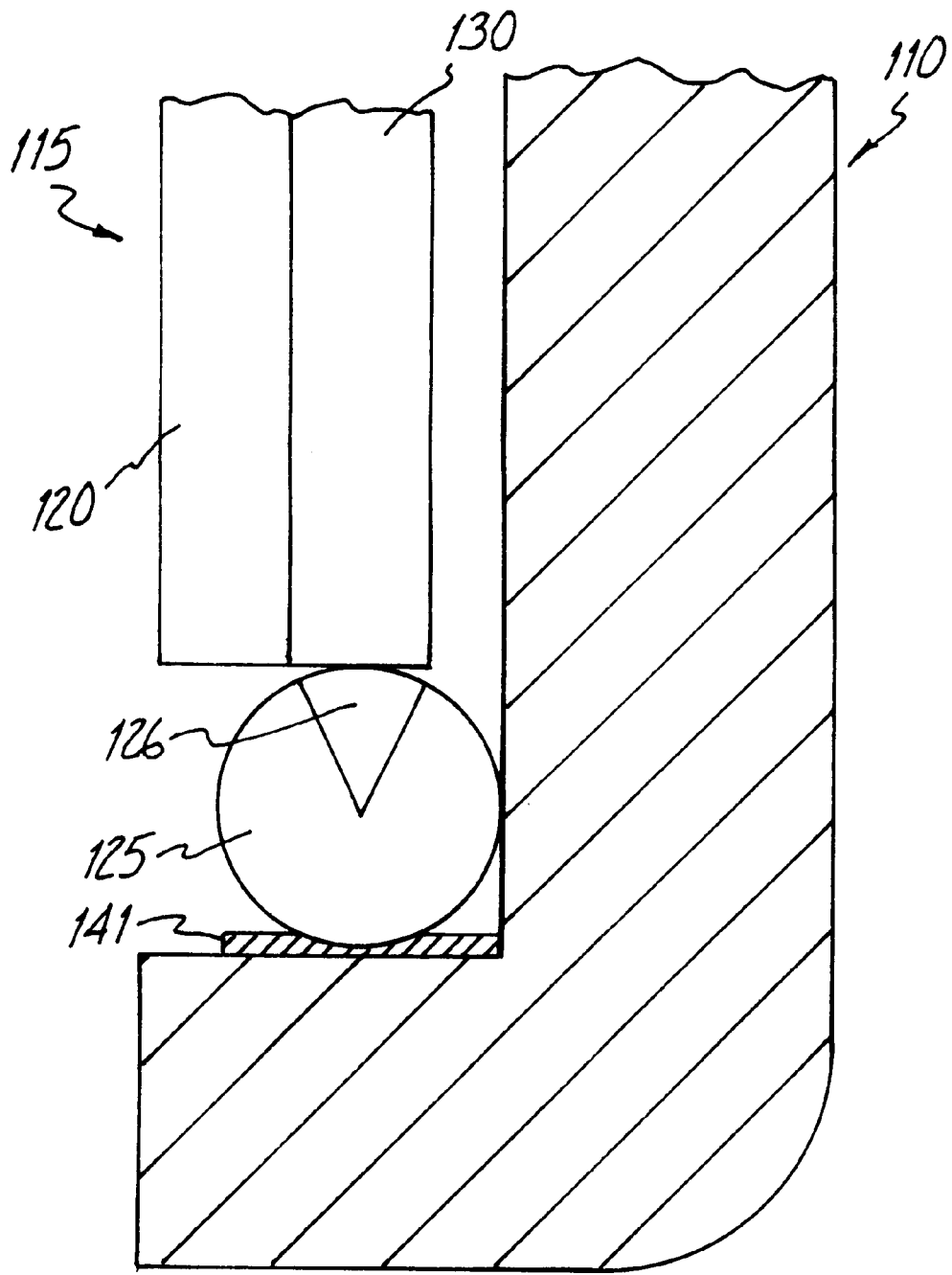
FIG. 7 is a modified close-up view of the lower portion of FIG. 5, with solar cells mounted on one side of the light source.

An alternative configuration appears in FIG. 5. Here, solar cells 137 are applied to the inner surface of housing 110 where it curves to form the lower side 111 of housing 110. Again, the shape required for the solar cells 137 to fit the inner housing surface may be difficult or expensive to manufacture. FIGS. 6 and 7 show two further alternative configurations that employ more commonly available planar arrays of solar cells. FIG. 6 shows a pair of planar solar cell arrays 139, 140 arranged to lie adjacent opposed sides of the light source 125. Neither array 139, 140 affects aperture 126. FIG. 7 shows a single planar array 141 of solar cells placed opposite the aperture 126. It will be recognized that other configurations of such planar arrays are possible, including a pair of planar arrays joined at one edge with a 90° or other angle between them or three planar arrays joined to form a through shape to partially surround the light source 125.

Figure 8:
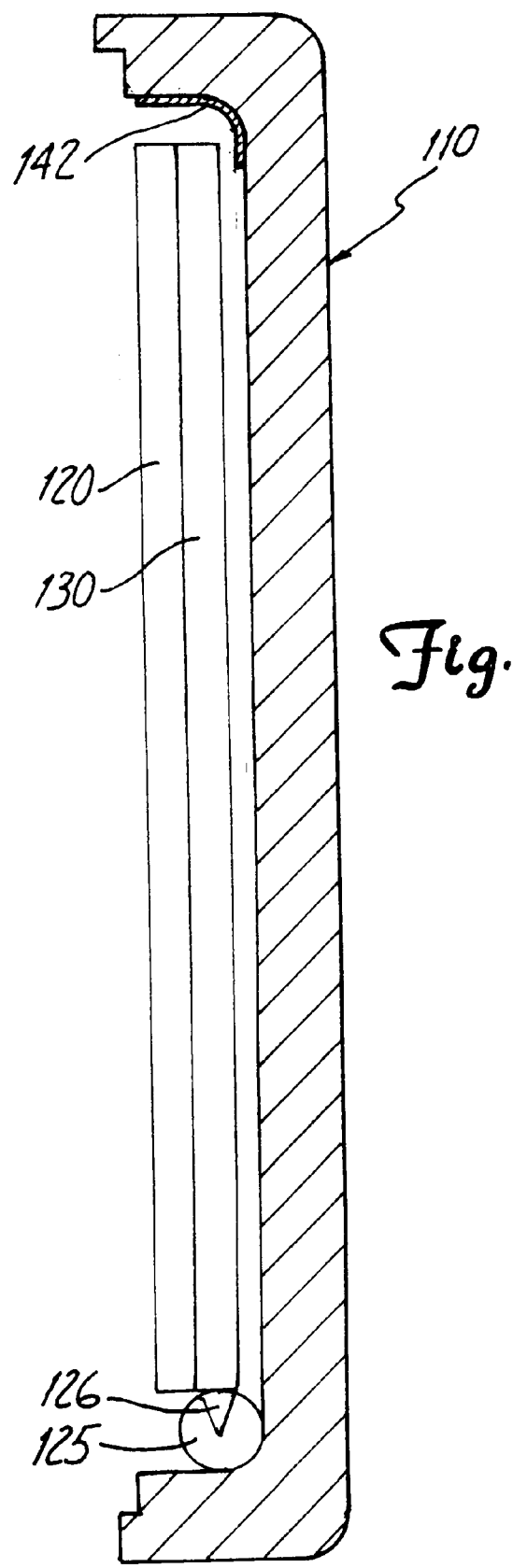
FIG. 8 is a cross-sectional view of a fliptop display screen of the notebook computer of FIG. 1 showing an array of solar cells positioned opposite the light pipe.

FIG. 8 shows yet another embodiment, where solar cells 142 are positioned on the side of the display screen opposite the lightpipe. In this embodiment, light that reaches the opposite side of the display screen is captured by solar cells 142. Although this light could be reflected back into the light pipe, in some situations this solution has drawbacks. For example, when the light is reflected back into the light pipe, the display intensity may not be uniform, thereby compromising display quality. For this reason, this light is often wasted, and not reflected back into the light pipe. By placing the solar cells 142 as shown in FIG. 8, this light can be used.

Among the benefits that may be associated with the present invention are: (1) additional battery life before the battery of a portable computer needs recharging; (2) recapture of light energy that would otherwise be wasted; and (3) provision of supplemental power to one component of a portable computer to help reduce battery load caused by that component.

Although the light sources shown in FIGS. 5–8 are cylindrical, it should be understood that light sources or backlights having a different construction and/or shape would also be capable of being effectively used in the present invention. In addition, although the present invention has been shown and described with respect to preferred embodiments, various changes and modifications that are obvious to a person skilled in the art to which the invention pertains, even if not shown or specifically described herein, are deemed to lie within the spirit and scope of the invention and the following claims.

What is claimed is:

1. A method of generating an electrical energy within a portable computer, the method comprising the acts of:
   illuminating a light source within the portable computer; and
   converting energy from the light source into electrical energy.

2. The method of claim 1, further comprising the act of:
   providing the electrical energy to a rechargeable battery within the portable computer.

3. The method of claim 1, further comprising the act of:
   providing the electrical energy to a particular component within the portable computer.

4. The method of claim 3, further comprising the act of:
   providing the electrical energy to the display screen within the portable computer.

5. A method of using electrical energy within a portable computer that uses a light source located within the portable computer for illuminating the display screen, the method comprising the acts of:
   placing solar cells in a position within the portable computer to capture light from the light source;

illuminating the light source; and converting energy from the light source into electrical energy.

6. The method of claim 5, wherein the act of placing solar cells in a position within the portable computer to capture light from the light source comprises the act of:

wrapping solar cells around at least a portion of the light source.

7. The method of claim 5, wherein the act of placing solar cells in a position within the portable computer to capture light from the light source comprises the act of:

placing solar cells on the sides of the light source.

8. The method of claim 5, wherein the act of placing solar cells in a position within the portable computer to capture light from the light source comprises the act of:

placing solar cells on one side of the light source.

9. The method of claim 8, wherein the light source comprises an aperture facing a lightpipe, and wherein the act of placing solar cells on one side of the light source comprises the act of:

placing solar cells on the side of the light source opposite of the aperture.

10. The method of claim 9, wherein the act of placing solar cells on one side of the light source comprises the act of:

placing solar cells on a surface that is immediately adjacent the light source.

11. The method of claim 5, wherein the act of placing solar cells in a position within the portable computer to capture light from the light source comprises the act of:

placing solar cells on a side of the display screen opposite to that of the light source.

12. A method of constructing a display panel assembly comprising the acts of:

positioning a display screen over a lightpipe so that light in the lightpipe is delivered to the display screen;

positioning a light source adjacent to the lightpipe so that the lightpipe is illuminated when the light source emits light;

disposing solar cells in the display panel assembly such that the solar cells may receive the light; and housing the light source, the light pipe, and the display screen in the display panel assembly.

13. The method of claim 12, further comprising the act of:

configuring the solar cells within the display panel assembly so that they surround at least a portion of the light source.

14. The method of claim 12, further comprising the act of:

configuring the solar cells so that they are adjacent to and on one side of the light source.

15. The method of claim 12, further comprising the act of:

configuring the solar cells so that two solar cell panels are adjacent to but on opposite sides of the light source.

16. The method of claim 12, further comprising the act of:

configuring the solar cells so that the solar cells are on a side of the display screen opposite to that of the light source.

* * * * *